United States Patent
Tabar et al.

(10) Patent No.: US 12,253,431 B1
(45) Date of Patent: Mar. 18, 2025

(54) METHOD AND SYSTEM FOR MONITORING A BLEED VALVE OF A GAS TURBINE ENGINE

(71) Applicant: Pratt & Whitney Canada Corp., Longueuil (CA)

(72) Inventors: Roja Tabar, Boucherville (CA); Alireza Gharagozloo, Boucherville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/470,473

(22) Filed: Sep. 20, 2023

(51) Int. Cl.
 *G01M 13/003* (2019.01)
 *F02C 9/18* (2006.01)

(52) U.S. Cl.
 CPC .............. *G01M 13/003* (2019.01); *F02C 9/18* (2013.01); *F05D 2220/323* (2013.01); *F05D 2260/606* (2013.01); *F05D 2260/80* (2013.01); *F05D 2270/709* (2013.01)

(58) Field of Classification Search
 CPC .... F02C 9/18; F05D 2270/709; G01M 13/003
 See application file for complete search history.

(56) References Cited

U.S. PATENT DOCUMENTS

| | | | |
|---|---|---|---|
| 6,539,783 | B1 | 4/2003 | Adibhatla |
| 10,060,358 | B2 | 8/2018 | Tiwari et al. |
| 10,822,996 | B2 | 11/2020 | Dowdell et al. |
| 2017/0298836 | A1* | 10/2017 | Tiwari ............... F02C 9/18 |
| 2017/0371305 | A1* | 12/2017 | Tiwari ............... G05B 9/02 |

FOREIGN PATENT DOCUMENTS

| | | |
|---|---|---|
| EP | 1103926 A2 | 5/2001 |
| EP | 4016128 A1 | 6/2022 |

OTHER PUBLICATIONS

European Search Report for EP Application No. 24201787 completed on Jan. 29, 2025.

* cited by examiner

*Primary Examiner* — Scott J Walthour
(74) *Attorney, Agent, or Firm* — Carlson, Gaskey & Olds, P.C.

(57) ABSTRACT

A method for monitoring a bleed valve of an aircraft engine includes obtaining operational data of the aircraft engine, the operational data indicative of operational performance of the aircraft engine. The method further includes utilizing one or more neural networks to determine a health status of a bleed valve of the aircraft engine based on the operational data, the bleed valve configured to bleed air from a compressor section of the aircraft engine, wherein the one or more neural networks have been trained with root cause data relating to a plurality of potential failure modes of the bleed valve.

15 Claims, 5 Drawing Sheets

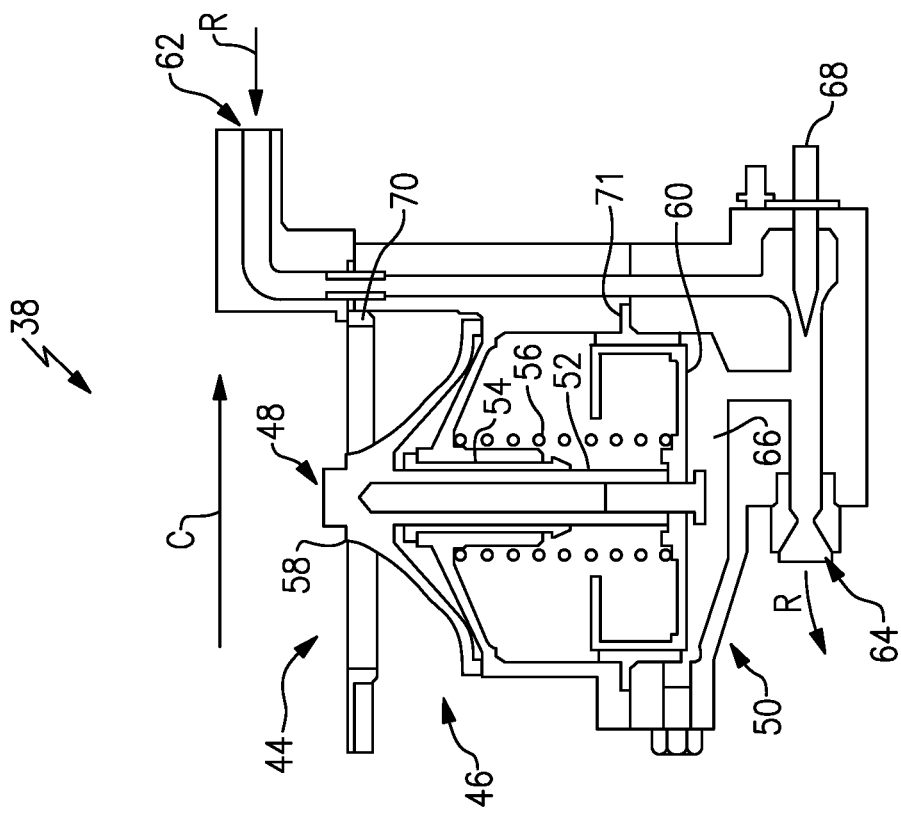
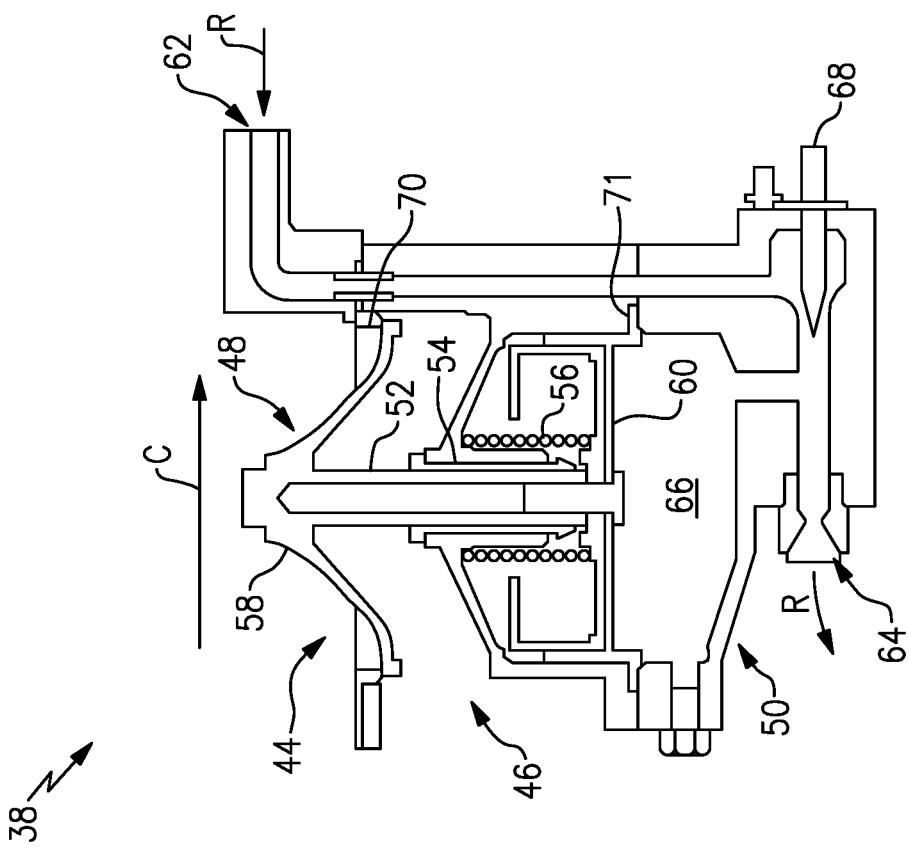

METHOD AND SYSTEM FOR MONITORING A BLEED VALVE OF A GAS TURBINE ENGINE

BACKGROUND

This disclosure relates to a method and system for monitoring the health of a bleed valve of a gas turbine engine using machine learning.

Gas turbine engines are known, and typically include a fan delivering air into a bypass duct as propulsion air. The fan also delivers air into a compressor section where it is compressed and then delivered to a combustor where it is mixed with fuel and ignited. Products of this combustion pass downstream over turbine rotors, driving them to rotate. The turbine rotors in turn drive the compressor and fan rotors.

Gas turbine engines are also known to include bleed valves, which divert air from the compressor section under certain conditions. This selective diversion, or bleeding, of compressor airflow assists the compressor section in maintaining stability and allows the gas turbine engine to operate more efficiently. Over time, such bleed valves may deteriorate and fail and thus no longer divert air in an optimal manner. This may result in engine surging, lower power output, and sluggish power increase.

Currently, it is difficult to detect issues in the bleed valve until the valve has either failed or has begun to significantly underperform. Moreover, the root cause of any such bleed valve failure is typically detected manually through troubleshooting and diagnostic testing.

SUMMARY

An exemplary method for monitoring a bleed valve of an aircraft engine includes obtaining operational data of the aircraft engine, the operational data indicative of operational performance of the aircraft engine. The method further includes utilizing one or more neural networks to determine a health status of a bleed valve of the aircraft engine based on the operational data, the bleed valve configured to bleed air from a compressor section of the aircraft engine, wherein the one or more neural networks have been trained with root cause data relating to a plurality of potential failure modes of the bleed valve.

Another example of the above described method for monitoring a bleed valve for an aircraft engine further includes providing an alert if the health status of the bleed valve indicates that the bleed valve has failed or that the bleed valve is expected to fail within a threshold amount of time.

In another example of any of the above described methods for monitoring a bleed valve for an aircraft engine, utilizing the one or more neural networks to determine a health status of the bleed valve includes determining a failure mode of the bleed valve.

In another example of any of the above described methods for monitoring a bleed valve for an aircraft engine, the aircraft engine is a gas turbine engine, the operational data is obtained from one or more sensors located on the gas turbine engine, and the operational data includes measurements of a turbine section temperature, a compressor section exit pressure, a compressor section rotational speed, a combustor section exit temperature, or a fuel flow rate.

In another example of any of the above described methods for monitoring a bleed valve for an aircraft engine, the root cause data comprises associations between failure modes of the bleed valve and previously obtained operational data.

In another example of any of the above described methods for monitoring a bleed valve for an aircraft engine, the root cause data is obtained by identifying a plurality of aircraft engines that have experienced a bleed valve failure, diagnosing a failure mode of the bleed valve for each of the aircraft engines, and obtaining operational data for each of the aircraft engines.

In another example of any of the above described methods for monitoring a bleed valve for an aircraft engine, the one or more neural networks determine the health status by also considering extrinsic factors affecting expected performance of the aircraft engine.

In another example of any of the above described methods for monitoring a bleed valve for an aircraft engine, the one or more neural networks have further been trained with performance profile data, the performance profile data comprising associations between previously obtained operational data and the extrinsic factors.

In another example of any of the above described methods for monitoring a bleed valve for an aircraft engine, the extrinsic factors include at least one of engine time on wing, external environmental conditions, weight of an aircraft to which the aircraft engine is mounted, and load on an accessory gearbox of the aircraft engine.

In another example of any of the above described methods for monitoring a bleed valve for an aircraft engine, utilizing the one or more neural networks to determine the health status of the bleed valve includes utilizing the one or more neural networks to determine an expected performance profile of the aircraft engine by associating the extrinsic factors with the performance profile data, and analyze the operational data for the presence of deviations compared to the expected performance profile.

In another example of any of the above described methods for monitoring a bleed valve for an aircraft engine, utilizing the one or more neural networks to determine a health status further includes utilizing the one or more neural networks to compare a detected deviation with the root cause data.

In another example of any of the above described methods for monitoring a bleed valve for an aircraft engine the plurality of potential failure modes include a failure of a seal of the bleed valve, a failure of a piston assembly of the bleed valve, and a failure of a pressure regulating assembly of the bleed valve.

In another example of any of the above described methods for monitoring a bleed valve for an aircraft engine, utilizing the one or more neural networks to determine the health status of the bleed valve includes utilizing the one or more neural networks to analyze a trend of the operational data over time.

An exemplary system includes a computing device including processing circuitry operatively connected to memory, the processing circuitry operable to obtain operational data of an aircraft engine, the operational data indicative of operational performance of the gas turbine engine, utilize one or more neural networks to determine a health status of a bleed valve based on the operational data, and wherein the one or more neural networks have been trained with root cause data relating to a plurality of potential failure modes of the bleed valve.

In another example of the above described system, the processing circuitry is operable to determine a failure mode of the bleed valve.

In another example of any of the above described systems, the root cause data is obtained by identifying a plurality of aircraft engines that have experienced a bleed valve failure, diagnosing a failure mode of the bleed valve for each of the aircraft engines, and obtaining operational data for each of the aircraft engines.

In another example of any of the above described systems, determining the health status includes the one or more neural networks also considering extrinsic factors affecting expected performance of the aircraft engine.

In another example of any of the above described systems, the one or more neural networks have further been trained with performance profile data, the performance profile data comprising associations between previously obtained operational data and the extrinsic factors.

In another example of any of the above described systems, determining the health status includes the one or more neural networks determining an expected performance profile of the aircraft engine by associating the extrinsic factors with the performance profile data, analyzing the operational data for the presence of deviations compared to the expected performance profile, and comparing a detected deviation with the root cause data.

In another example of any of the above described systems the aircraft engine is a gas turbine engine, and the system further includes the gas turbine engine. The gas turbine engine includes a compressor section, a combustor section, and a turbine section, wherein the bleed valve is located in the compressor section and configured to bleed airflow from the compressor section, and wherein the operational data is obtained from one or more sensors located in one or more of the compressor section, the combustion section, and the turbine section.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

FIG. 2 illustrates an example bleed valve in an open state.

FIG. 3 illustrates the bleed valve of FIG. 2 in a closed state.

DETAILED DESCRIPTION

Figure 1:
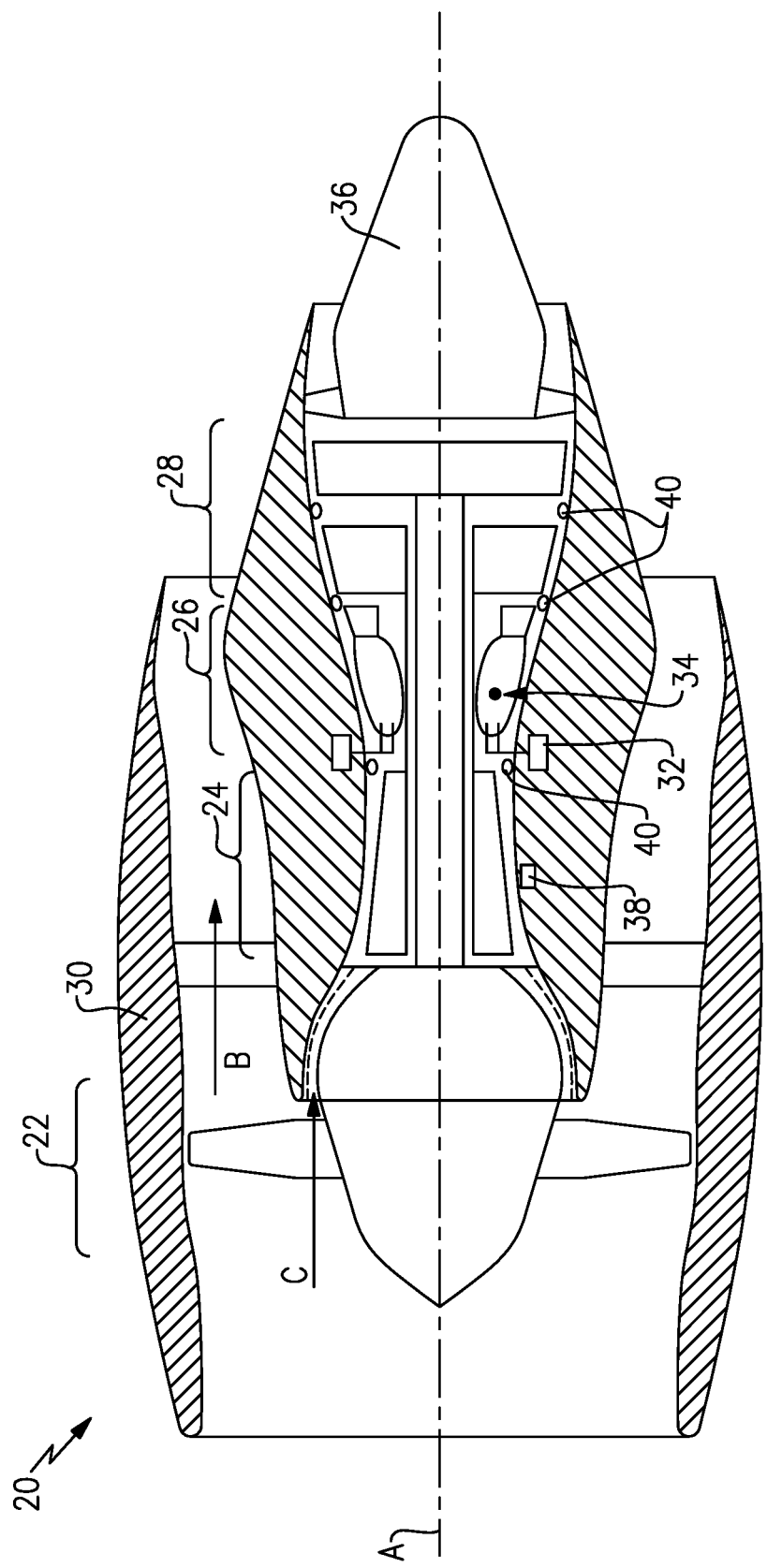
FIG. 1 schematically illustrates an example gas turbine engine.

FIG. 1 schematically illustrates a gas turbine engine 20. The example gas turbine engine 20 is a turbofan that generally incorporates a fan section 22, a compressor section 24, a combustor section 26 and a turbine section 28. The fan section 22 drives air along a bypass flow path B in a bypass duct defined within a nacelle 30. The gas turbine engine 20 intakes air along a core flow path C into the compressor section 24 for compression and communication into the combustor section 26. In the combustor section 26, the compressed air is mixed with fuel from a fuel system 32 and ignited by igniter 34 to generate an exhaust gas flow that expands through the turbine section 28 and is exhausted through exhaust nozzle 36. Although a turbofan gas turbine engine is depicted and described, it should be understood that the concepts described herein are not limited to use with such configurations, and the teachings of this disclosure may be applied to any other types of aircraft engines.

The gas turbine engine 20 further includes at least one bleed valve 38 in the compressor section 24 and a plurality of sensors 40. As will be described further below, the bleed valve 38 diverts a portion of air from the core airflow C during certain operating conditions. In some examples, the diverted air is subsequently routed to other sections of the gas turbine engine 20, such as the turbine section 28, and used for cooling applications.

The sensors 40 may be located in any one or more of the compressor section 24, the combustor section 26, and the turbine section 28, and are configured to obtain operational data of the gas turbine engine 20. The sensors 40 are configured to communicate signals indicative of this data to a computing device 102 (shown in FIG. 4), which may be remote from the gas turbine engine 20.

In this disclosure "operational data" relates to the operational parameters of the gas turbine engine 20, and may include data relating to a combustor section 26 exit temperature, a compressor section 24 exit pressure, a compressor section 24 rotational speed, an inter turbine temperature in the turbine section 28, a fuel flow rate of the fuel system 32, a pressure ratio of the compressor section 24, or any other parameter relating to power output or operational performance of the gas turbine engine 20. The operational data may be obtained during any operating condition of the gas turbine engine 20, such as during take-off, cruise, acceleration, deceleration, etc., and may be obtained over multiple missions (i.e., flights) of the gas turbine engine 20. More relevant to helicopter engines, which fall within the scope of this disclosure, the operational data may be obtained during a power assurance check and may comprise a power assurance check margin.

FIGS. 2 and 3 illustrate an example bleed valve 38 in a closed position (FIG. 2) and an open position (FIG. 3). The bleed valve 38 is configured to selectively allow fluid communication between an inlet 44 and an outlet 46 depending on the operating condition of the gas turbine engine 20. The bleed valve 38 includes a piston assembly 48 and a pressure regulating assembly 50. The pressure regulating assembly 50 includes a pressure regulating fluid R and controls a threshold pressure of the core airflow C required for the bleed valve 38 to move from the closed to the open position.

The piston assembly 48 generally includes a piston 52 that is received in a piston guide 54 and biased by a spring 56. The piston guide 54 constrains the piston 52 to linear movement between the closed position and the open position. The spring 56 provides a bias on the piston 52 towards the pressure regulating fluid R of the pressure regulating assembly 50, and accordingly, provides a bias towards the open position. The piston 52 further includes a top portion 58 that is configured to block fluid flow between the inlet 44 and the outlet 46 in the closed position, and a bottom portion 60 configured to engage with and receive a force from the pressure regulating fluid R.

The pressure regulating assembly 50 includes an inlet 62, an outlet 64, a cavity 66, and an adjustment stem 68. The inlet 62 is configured to receive the pressure regulating fluid R and the outlet 64 is configured to discharge the pressure regulating fluid R. Between the inlet 62 and the outlet 64, the pressure regulating fluid R is communicated to the cavity 66, which also houses the bottom portion 60 of the piston 52. The adjustment stem 68 is configured to adjust the pressure of the pressure regulating fluid R.

The bleed valve 38 also includes one or more seals. In this example, the bleed valve 38 includes a first O-ring seal 70 between the top portion 58 of the piston 52 and the inlet 44 that prevents core airflow C from leaking through the inlet 44 when the bleed valve 38 is in the closed position. A second rolling diaphragm seal 71 is provided between the bottom portion 60 of the piston 52 and the walls of the cavity 66 to prevent leakage of the pressure regulating fluid R.

During operation of the gas turbine engine 20 in low power settings, it is desirable for the bleed valve 38 to remain in the open position. The bleed valve 38 stays in the open position as long as the combined force of the spring 56 plus the force that the core airflow C applies to the top portion 58 of the piston 52 is greater than the force applied by the pressure regulating fluid R against the bottom portion 60 of the piston 52. On the other hand, during higher power operating conditions, such as during acceleration, it is desirable for the bleed valve 38 to be biased to the closed position. During such operating conditions, the pressure of the pressure regulating fluid R may increase and thereby overcome the combined forces provided by the spring 56 and the core airflow C to close the bleed valve 38.

Accordingly, during operation of the gas turbine engine 20, the bleed valve 38 modulates between the open and closed position to accommodate different operating conditions of the gas turbine engine 20. When pressure of the core airflow C in the compressor section 24 exceeds the threshold set by the pressure regulating assembly 50, the bleed valve 38 opens to reduce pressure and maintain stability in the compressor section 24. The operation of the bleed valve 38 may be as known.

It should be understood that the specific bleed valve 38 configuration shown in FIGS. 2 and 3 is exemplary, and the systems and methods of this disclosure are equally applicable to other bleed valve configurations.

In the harsh environment of the gas turbine engine 20, over time the bleed valve 38 may experience any number of component failures due to wear. For example, one of the seals 70, 71 may fail and allow leakage of the core airflow C between the top portion 58 of the piston 52 and the inlet 44, or allow leakage of the pressure regulating fluid R between the bottom portion 60 of the piston 52 and the walls of the cavity. The piston assembly 48 may fail via deformation or otherwise, such that the bleed valve 38 may no longer fully open or close. The pressure regulating assembly 50 may also experience a component failure, and therefore fail to set an appropriate pressure threshold for modulation of the bleed valve 38.

These component failures may cause the bleed valve 38 to leak more or less core airflow C then desired or cause the bleed valve 38 to have a delayed or lagging response. These failures of the bleed valve 38 may, in turn, have deleterious effects on various operational parameters of the gas turbine engine 20. For example, a failure of the bleed valve 38 may cause the compressor section 24 to deliver lower pressure air to the combustor section 26 then desired. Combustion of this lower pressure air may lead to a lower temperature of combustion products exiting the combustor section 26. The controls of the gas turbine engine 20 may then attempt to compensate by increasing a rate of fuel pushed through the fuel system 32 and increasing the rotational speed of the compressor section 24. As another example, temperatures in the turbine section 28, such as an inter-turbine temperature, may increase due to the bleed valve 38 failing to communicate a sufficient amount of cooling airflow.

Accordingly, a failure in the bleed valve 38 will have an effect on the operational data detected by the sensors 40, and different failure modes of the bleed valve 38 may affect the operational data in different ways. This application utilizes one or more neural networks to analyze the operational data to determine when a failure has occurred or is imminent and determine a specific failure mode, or root cause, of such a failure. While this application refers to neural networks, it should be understood that the contents of this disclosure may be applied with any type of machine learning methodology.

Figure 4:
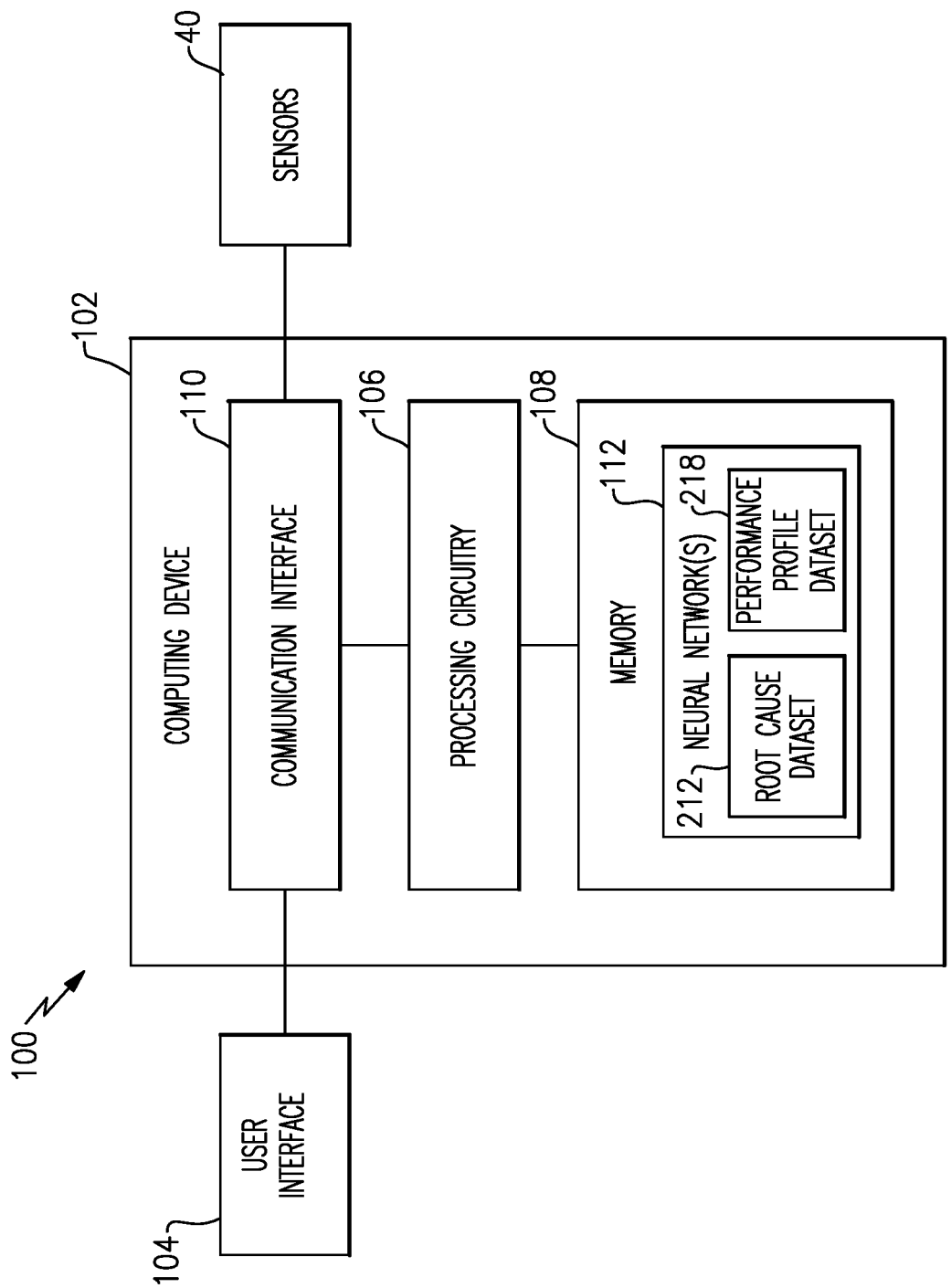
FIG. 4 schematically illustrates an example system for monitoring the health of a bleed valve of a gas turbine engine.

FIG. 4 is a schematic view of an example system 100 for monitoring a bleed 38 valve of a gas turbine engine (e.g., the gas turbine engine 20 of FIG. 1). The example system includes a computing device 102 and a user interface 104. The computing device 102 includes processing circuitry 106 operatively connected to a memory 108 and a communication interface 110.

The processing circuitry 106 may include one or more microprocessors, microcontrollers, application specific integrated circuits (ASICs), or the like. The processing circuitry 106 may be operable to perform the steps of method 300 described below.

The memory 108 can include any one or combination of volatile memory elements (e.g., random access memory (RAM, such as DRAM, SRAM, SDRAM, VRAM, etc.) and/or nonvolatile memory elements (e.g., ROM, hard drive, tape, CD-ROM, etc.). Moreover, the memory 108 may incorporate electronic, magnetic, optical, and/or other types of storage media. The memory 108 can also have a distributed architecture, where various components are situated remotely from one another, but can be accessed by the processing circuitry. The memory 108 further includes one or more neural networks 112.

The communication interface 110 is configured to receive the data from the sensors 40 and to communicate with the user interface 104. In some examples, the communication interface 110 further communicates with a controller of the gas turbine engine 20, or a controller of the aircraft mounting the gas turbine engine 20.

Figure 5:
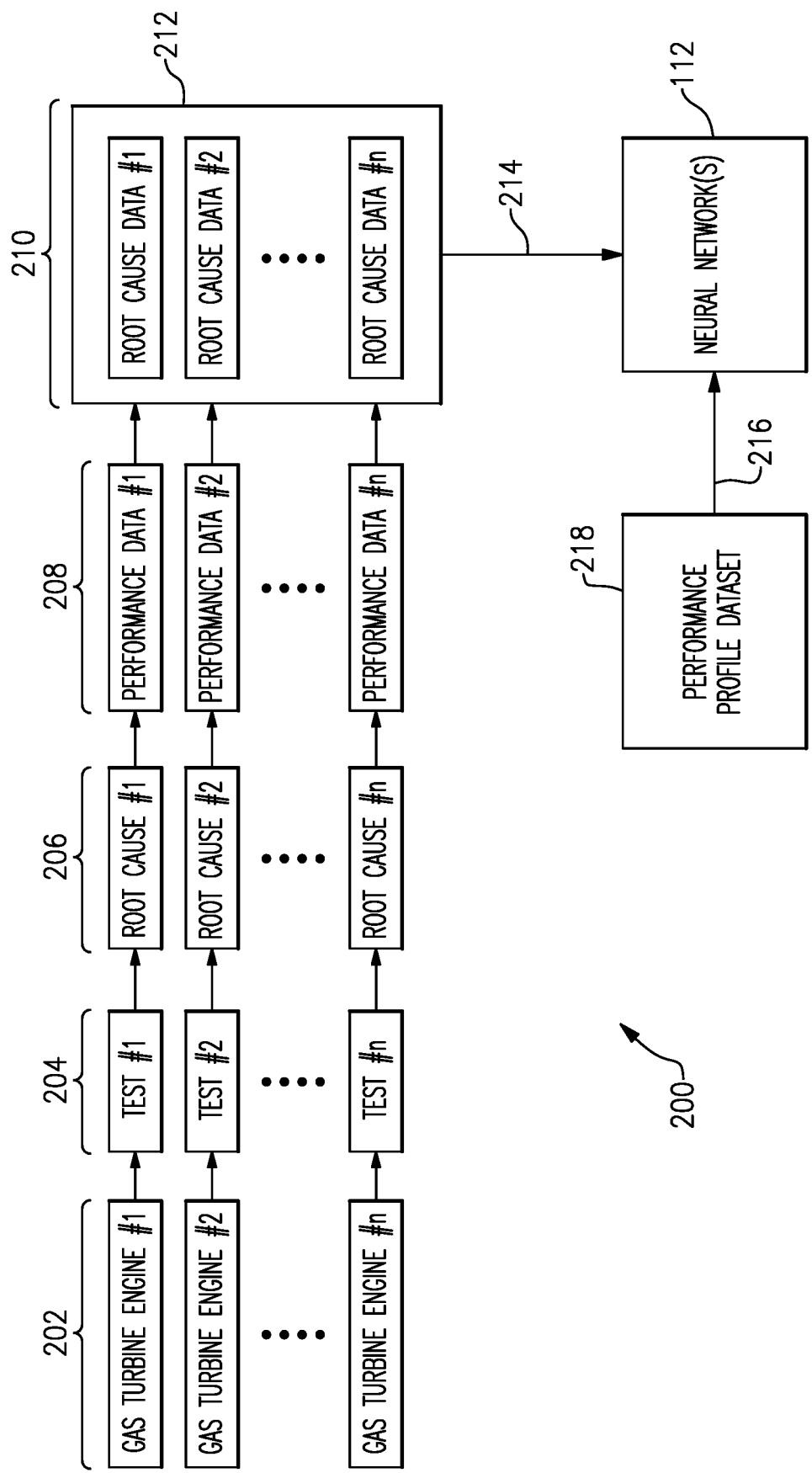
FIG. 5 shows an example flowchart for training a neural network of the system of FIG. 4.

FIG. 5 illustrates a flowchart 200 for training the one or more neural networks 112 of system 100. At step 202 a gas turbine engine 20 with a bleed valve 38 failure is identified. Step 202 may include manual determinations of the likely presence of a bleed valve issue. For example, variations in a compressor section 24 running line may indicate some form of bleed valve 38 failure to an operator or inspector of the gas turbine engine 20.

At step 204 an inspector runs diagnostic tests or troubleshooting on the gas turbine engine 20. Step 204 may include disassembly and visual inspection of the bleed valve of the gas turbine engine. Step 204 may also include testing the gas turbine engine 20 in a test cell where flight scenarios are recreated and data is recorded. At step 206, based on the testing and troubleshooting of step 204, the inspector confirms the presence of a bleed valve 38 failure in the gas turbine engine 20 and determines a root cause of the failure. For example, the inspector may determine that any one or more of the seals 70, 71 the piston assembly 48, or the pressure regulating assembly 50 have failed and thereby caused the bleed valve to stop functioning properly.

At step 208, operational data of the gas turbine engine 20 is obtained. Step 208 may include obtaining operational data both prior to and after the occurrence of the bleed valve 38 failure with sensors 40 on the gas turbine engine 20 and communicating that data to a computing device 102.

At step 210 a root cause data point is developed which associates the manually determined root cause of the bleed valve 38 failure with the operational data for the gas turbine engine 20 obtained at step 208. Step 210 may include the inspector inputting the manually determined root cause via the user interface 104 of the computing device 102.

Steps 202 through 210 are iterated for a plurality of gas turbine engines experiencing bleed valve failures. The root cause data points developed for each of the gas turbine engines collectively establish a root cause dataset 212. In one example, the plurality of gas turbine engines included in the root cause dataset 212 all include identical configurations, however the root cause dataset 212 may also include data from a verity of different gas turbine engine configurations.

At step 214 the root cause dataset 212 is provided to the one or more neural networks 112 as training data.

At step 216 a performance profile dataset 218 is also provided to the one or more neural networks 112 as training data. The performance profile dataset 218 includes associations between operational data from a plurality of gas turbine engine missions with extrinsic factors affecting engine performance during those missions.

In this disclosure "extrinsic factors" refers to any factor other than a bleed valve issue that may affect operational data obtained from the gas turbine engine 20. As an example, gas turbine engines naturally lose efficiency over time, and thus there is a correlation between the length of time the engine has been in operation (sometimes referred to as "engine time on wing") and the operational data. As other non-limiting examples, the weight of an aircraft mounting the gas turbine engine 20, the load requirements of an accessory gearbox of the gas turbine engine 20, and external environmental factors (i.e., external temperature and altitude) may all impact operation of the gas turbine engine 20 and thus the operational data.

Steps 214 and 216 may include supervised learning, unsupervised learning, reinforcement learning, or any other appropriate method of training the one or more neural networks 112.

Figure 6:
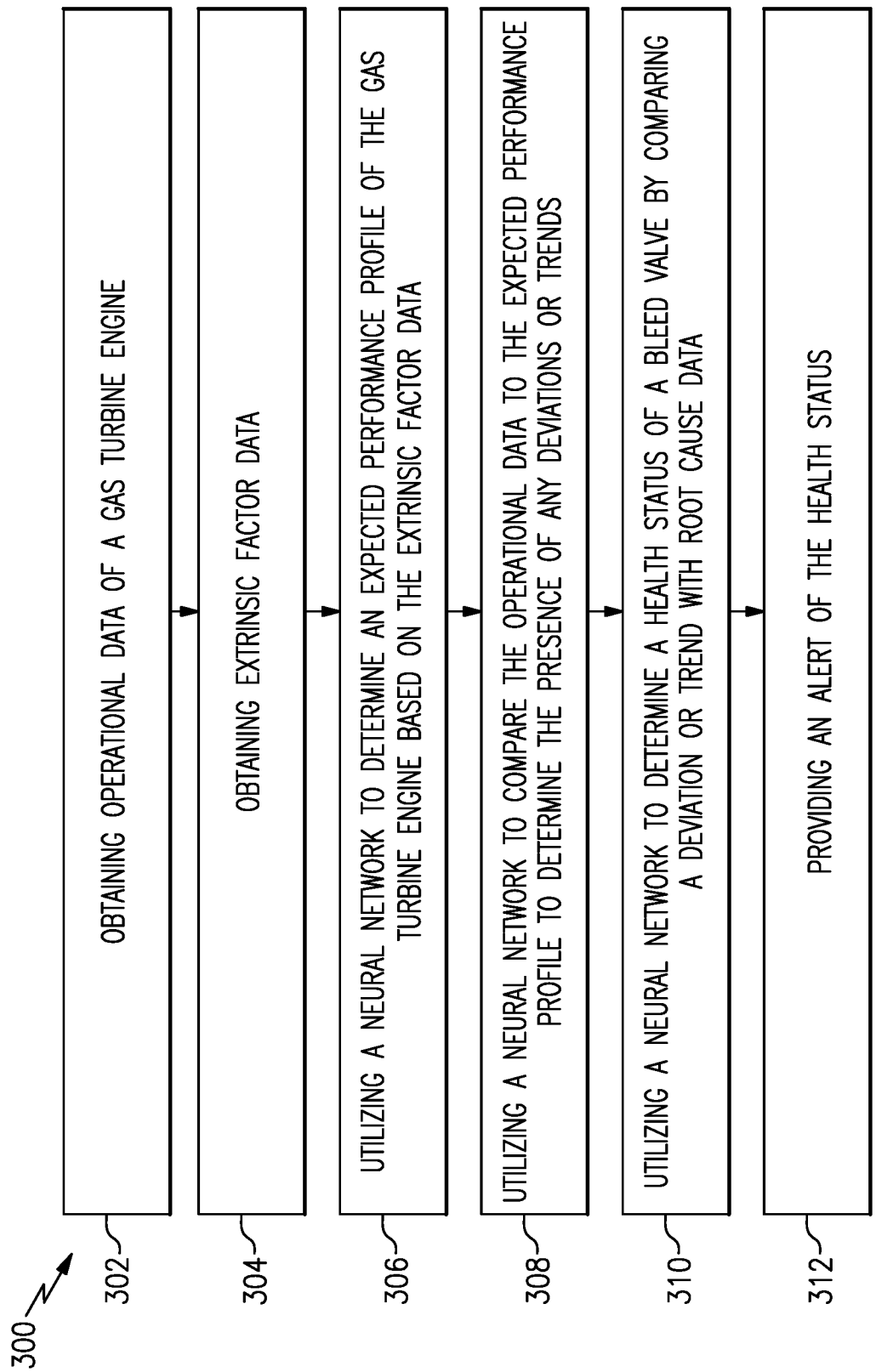
FIG. 6 shows an example method flowchart for monitoring the health of a bleed valve of a gas turbine engine.

FIG. 6 illustrates a method 300 for monitoring the health of the bleed valve 38 of a gas turbine engine 20 with the system 100. At step 302 operational data of the gas turbine engine 20 is obtained from at least one sensor 40. At step 304 extrinsic data relating to extrinsic factors affecting operational performance of the gas turbine engine 20 is obtained. The extrinsic data of step 304 may also be captured by sensors 40, or may be inputted by an operator using user interface 104, stored in the memory 108, or communicated from any other external computing device or controller, such as a controller of the gas turbine engine 20 or the controller of an aircraft mounting the gas turbine engine 20.

At step 306, at least one neural network 112 determines an expected performance profile of the gas turbine engine 20 by associating the extrinsic data with the performance profile dataset 218. The expected performance profile is a determination of how the gas turbine engine 20 is expected to perform in view of the extrinsic factors.

At step 308, the at least one neural network 112 analyzes the operational data obtained from the sensors 40 in comparison to the expected performance profile to determine the presence of any deviations. A detected deviation between the expected performance profile of the gas turbine engine 20 and the operational data obtained for the gas turbine engine 20 may be indicative of a failure of the bleed valve 38.

It should be understood that the operational data may be obtained over time and over a plurality of missions of the gas turbine engine 20. Accordingly, step 308 may include analyzing trends in the operational data of the gas turbine engine 20. For example, prior to any complete failure of the bleed valve 38, there may be a negative trend in the operational parameters as the bleed valve 38 approaches a certain failure mode.

The extrinsic factors experienced by the gas turbine engine 20 may also vary over time and thus the expected performance profile generated at step 306 may also vary. This variation serves to normalize the operational data, or isolate changes in the operational data that may be attributed to a failure of the bleed valve 38.

At step 310, the at least one neural network 112 compares any deviation or trend detected at step 308 with the root cause dataset 212 to determine a health status of the bleed valve 38. In an example, step 310 includes a comparison of a deviation or trend identified at step 308 for the subject gas turbine engine 20 with operational data of gas turbine engines included in the root cause dataset during, or just prior to, the occurrence of a particular bleed valve failure mode. Step 310 may include determining that the bleed valve 38 is functioning properly, that the bleed valve 38 has failed, or that the bleed valve 38 is likely to fail after a threshold amount of further time in use in the gas turbine engine 20.

Step 310 may further include determining a likely root cause or specific failure mode of a failure in the bleed valve 38. As noted above, potential failure modes of the bleed valve include a failure of the seals 70, 71 failure in the piston assembly 48, such as a failure of the spring 56, or failure in the pressure regulating assembly 50. Step 310 may include the at least one neural network 112 assigning a confidence score to each potential failure mode.

At step 312 an alert is provided to the user interface 104 based on the health status determined in step 310. The alert may indicate to an operator that the bleed valve 38 has failed and requires maintenance, and may also provide information relating to the most likely failure mode of the bleed valve 38. The alert may also indicate that the bleed valve 38 is expected to fail after a threshold amount of operational time.

The systems and methods of this disclosure may be used to detect when a bleed valve is trending towards a failure and raise advanced warning for preventative maintenance activity, such as repair or replacement of the bleed valve. Accordingly, in-flight failure of the bleed valve, and the associated negative effects on engine operational performance may be avoided. Further, by providing an indication of a specific failure mode of the bleed off valves, the disclosed systems and methods simplify troubleshooting and diagnostic testing and reduce maintenance costs.

Although embodiments have been disclosed, a worker of skill in this art would recognize that modifications would come within the scope of this disclosure. For that reason, the following claims should be studied to determine the true scope and content.

What is claimed is:

1. A method for monitoring a bleed valve of an aircraft engine, the method performed by a computing device comprising processing circuitry operatively connected to memory, the memory storing instructions thereon, the method comprising executing the instructions using the processing circuitry to perform the steps of:
   obtaining operational data of the aircraft engine, the operational data indicative of operational performance of the aircraft engine;
   utilizing one or more neural networks defined by the stored instructions to determine a health status of the bleed valve of the aircraft engine based on the operational data, the bleed valve configured to bleed air from a compressor section of the aircraft engine;
wherein the one or more neural networks have been trained with root cause data relating to a plurality of potential failure modes of the bleed valve,
wherein the root cause data comprises associations between the plurality of potential failure modes of the bleed valve and previously obtained operational data for a plurality of aircraft engines,
wherein the root cause data is obtained by:
identifying a plurality of aircraft engines that have experienced a bleed valve failure;
diagnosing a failure mode of the bleed valve for each of the plurality of aircraft engines; and
obtaining operational data for each of the plurality of aircraft engines,
wherein utilizing the one or more neural networks to determine the health status of the bleed valve includes determining a failure mode of the bleed valve based on the root cause data.

2. The method of claim 1, further comprising providing an alert if the health status of the bleed valve indicates that the bleed valve has failed or that the bleed valve is expected to fail within a threshold amount of time.

3. The method of claim 1, wherein the aircraft engine is a gas turbine engine, the operational data is obtained from one or more sensors located on the gas turbine engine, and the operational data includes measurements of a turbine section temperature, a compressor section exit pressure, a compressor section rotational speed, a combustor section exit temperature, or a fuel flow rate.

4. The method of claim 1, wherein the one or more neural networks determine the health status by also considering extrinsic factors affecting expected performance of the aircraft engine.

5. The method of claim 4, wherein the one or more neural networks have further been trained with performance profile data, the performance profile data comprising associations between previously obtained operational data and the extrinsic factors.

6. The method of claim 5, wherein the extrinsic factors include at least one of engine time on wing, external environmental conditions, weight of an aircraft to which the aircraft engine is mounted, and load on an accessory gearbox of the aircraft engine.

7. The method of claim 5, wherein the utilizing the one or more neural networks to determine the health status of the bleed valve includes utilizing the one or more neural networks to:
determine an expected performance profile of the aircraft engine by associating the extrinsic factors with the performance profile data; and
analyze the operational data for the presence of deviations compared to the expected performance profile.

8. The method of claim 7, wherein the utilizing the one or more neural networks to determine the health status further includes utilizing the one or more neural networks to compare detected deviations with the root cause data.

9. The method of claim 1, wherein the plurality of potential failure modes include a failure of a seal of the bleed valve, a failure of a piston assembly of the bleed valve, and a failure of a pressure regulating assembly of the bleed valve.

10. The method of claim 1, wherein the utilizing the one or more neural networks to determine the health status of the bleed valve includes utilizing the one or more neural networks to analyze a trend of the operational data over time.

11. A system comprising:
a computing device including processing circuitry operatively connected to memory, the memory having instructions stored thereon which, when executed by the processing circuitry, cause the processing circuitry to:
obtain operational data of an aircraft engine, the operational data indicative of operational performance of the aircraft engine, and
utilize one or more neural networks defined by the stored instructions to determine a health status of a bleed valve of the aircraft engine based on the operational data, the bleed valve configured to bleed air from a compressor section of the aircraft engine; and
wherein the one or more neural networks have been trained with root cause data relating to a plurality of potential failure modes of the bleed valve,
wherein the root cause data comprises associations between the plurality of potential failure modes of the bleed valve and previously obtained operational data for a plurality of aircraft engines,
wherein the root cause data is obtained by:
identifying a plurality of aircraft engines that have experienced a bleed valve failure;
diagnosing a failure mode of the bleed valve for each of the plurality of aircraft engines; and
obtaining operational data for each of the plurality of aircraft engines,
wherein the instructions, when executed by the processing circuitry, further cause the processing circuitry to utilize the one or more neural networks to determine a failure mode of the bleed valve based on the root cause data.

12. The system of claim 11, wherein the instructions, when executed by the processing circuitry, further cause the processing circuitry to utilize determining the health status the one or more neural networks to determine the health status of the bleed valve also considering extrinsic factors affecting expected performance of the aircraft engine.

13. The system of claim 12, wherein the one or more neural networks have further been trained with performance profile data, the performance profile data comprising associations between previously obtained operational data and the extrinsic factors.

14. The system of claim 13, wherein the instructions, when executed by the processing circuitry, further cause the processing circuitry to utilize the one or more neural networks to:
determine an expected performance profile of the aircraft engine by associating the extrinsic factors with the performance profile data;
analyze the operational data for the presence of deviations compared to the expected performance profile; and
compare detected deviations with the root cause data.

15. The system of claim 11, wherein the aircraft engine is a gas turbine engine, the system further comprising the gas turbine engine, and the gas turbine engine including:
the compressor section, a combustor section, and a turbine section;
wherein the bleed valve is located in the compressor section; and wherein the operational data is obtained from one or more sensors located in one or more of the compressor section, the combustion section, and the turbine section.

* * * * *